[11] 3,843,771
[45] Oct. 22, 1974

Urban

[54] METHOD FOR SUPPRESSING SULFATE MAKE IN A SO₂ SCRUBBING STEP

[75] Inventor: Peter Urban, Northbrook, Ill.

[73] Assignee: Universal Oil Products Company, Des Plaines, Ill.

[22] Filed: Feb. 14, 1972

[21] Appl. No.: 226,018

Related U.S. Application Data

[63] Continuation-in-part of Ser. No. 9,968, Feb. 9, 1970, Pat. No. 3,644,087.

[52] U.S. Cl. .............................. 423/514, 423/242
[51] Int. Cl. .............................................. C01b 17/64
[58] Field of Search .......................... 423/242, 514

[56] References Cited
UNITED STATES PATENTS

| | | | |
|---|---|---|---|
| 1,760,137 | 5/1930 | Howard | 423/514 |
| 3,644,087 | 2/1972 | Urban | 423/514 X |

*Primary Examiner*—G. O. Peters
*Attorney, Agent, or Firm*—James R. Hoatson, Jr.; Thomas K. McBride; William H. Page, II

[57] ABSTRACT

A process for the removal of $SO_2$ from a gas stream containing $SO_2$ and $O_2$ wherein the use of a conventional scrubbing solution containing an alkaline reagent results in the formation of an undesired, intractable sulfate by-product, is improved by adding to the scrubbing zone a reducing agent, selected from the group consisting of finely divided sulfur, a polysulfide compound, a water-soluble sulfide compound and mixtures thereof in an amount corresponding to about 5 to about 95% of the stoichiometric amount of reducing agent necessary to convert all of the absorbed $SO_2$ into thiosulfate, and by thereafter operating the scrubbing zone under thiosulfate production conditions. Principal utility of this improved process is associated with the process for scrubbing $SO_2$ from the flue or stack gas stream containing oxygen wherein it is desired to minimize sulfate by-produts and prevent the contamination of the treated gas stream. Key feature of this improved process involves the selective conversion of a portion of the absorbed $SO_2$ to the corresponding thiosulfate compound within the scrubbing zone thereby minimizing the opportunity for the oxygen contained in the input gas stream to oxidize the freshly absorbed $SO_2$ to the undesired sulfate by-product.

20 Claims, 1 Drawing Figure

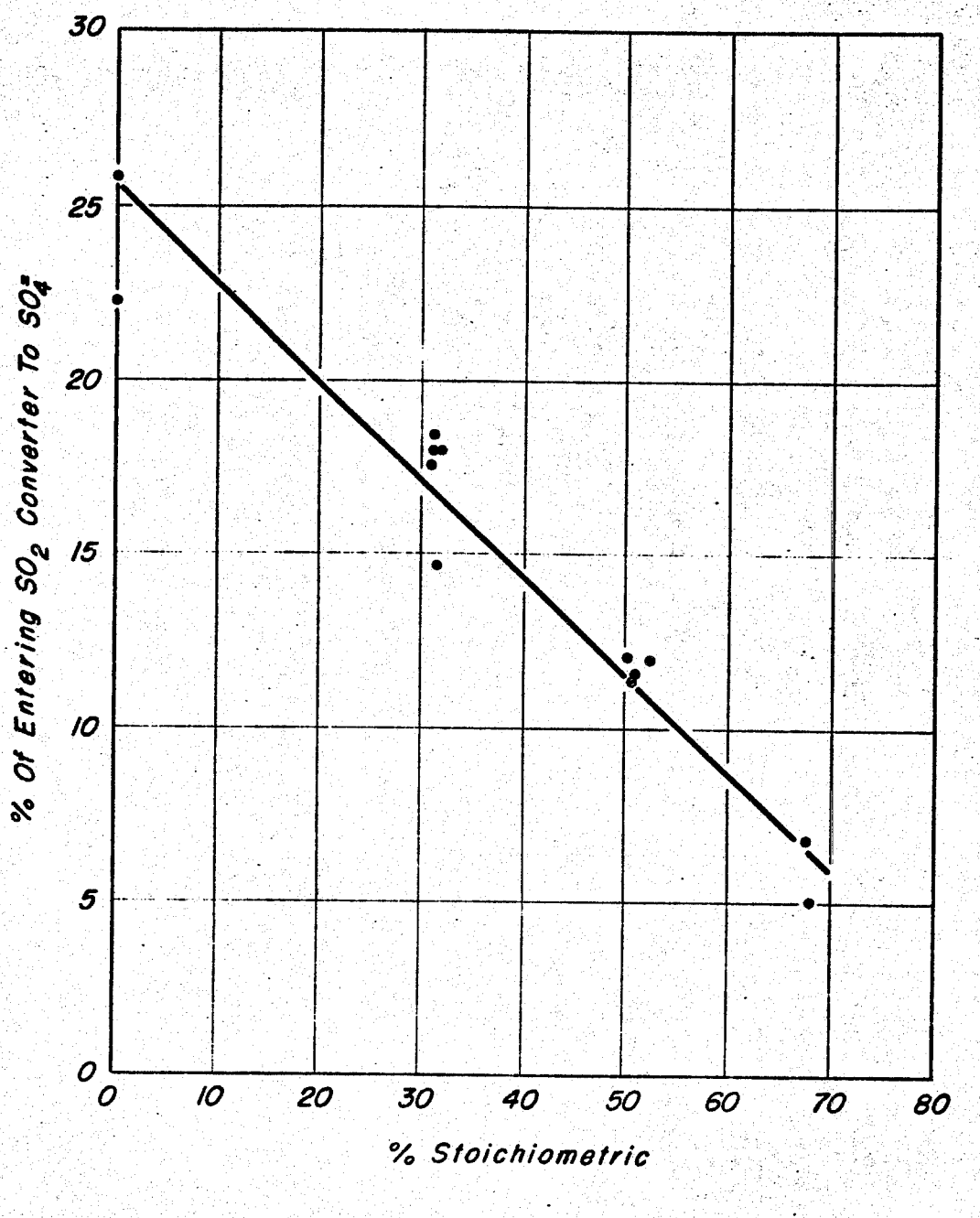

METHOD FOR SUPPRESSING SULFATE MAKE IN A $SO_2$ SCRUBBING STEP

CROSS-REFERENCES TO RELATED APPLICATIONS

This application is a continuation-in-part of my prior, copending application Ser. No. 9,968 which was filed on Feb. 9, 1970 now Pat. No. 3,644,087.

The subject of the present invention is an improvement in a process for scrubbing $SO_2$ from a gas stream containing $SO_2$ and $O_2$, in which process the scrubbing solution is a conventional aqueous solution containing an alkaline reagent. The improvement involves a method for suppressing at least a portion of the undesired sulfate by-products of the scrubbing step. This suppression is accomplished by introducing into the scrubbing zone a sufficient quantity of a reducing agent which is effective to convert at least a portion of the absorbed sulfur dioxide into the corresponding thiosulfate compound as it is formed. This conversion of the absorbed $SO_2$ to the corresponding thiosulfate compound acts to restrict the opportunity for the oxygen contained in the gas stream to oxidize the absorbed $SO_2$ (i.e., typically present as a water-soluble sulfite compound) to the undesired sulfate by-products. In one important aspect, the present invention involves an improvement in a process for scrubbing $SO_2$ from a gas stream containing $SO_2$ and $O_2$ where the scrubbing solution is an aqueous solution of sodium hydroxide or sodium carbonate and where sodium sulfate is an undesired by-product of the scrubbing step. The improvement of the present invention in this case involves the addition of a reducing agent such as sodium hydrosulfide to the scrubbing zone in an amount selected to reduce at least a portion of the absorbed sulfur dioxide to sodium thiosulfate. This in situ conversion of the absorbed sulfur oxide to sodium thiosulfate acts to limit the opportunity for the oxygen contained in the gas stream to oxidize the sulfur dioxide to the undesired, refractory sodium sulfate by-product.

A major problem encountered in many areas of industry today is associated with the production of waste gas streams containing sulfur dioxide. The problem essentially involves the disposal of these waste gas streams without causing substantial air pollution. This problem is an extremely complex one because of the wide variety of industrial sources that emit these sulfur dioxide-containing gas streams. One of the more common sources is associated with the combustion of sulfur-containing fuels in boilers, internal combustion engines, heating units, etc., to produce flue or stack gas streams containing sulfur dioxide. Similarly, waste gas streams of this type are generally produced by other industrial processes such as the smelting of sulfur-bearing ores, the refining of sulfur-containing crude oils, the synthesis of sulfuric acid, the sulfonation of hydrocarbons, the production of coke, the production of sulfur in a Claus process, the production of paper via a woodpulping process, and the like industrial processes. It is well known that the indiscriminate discharge of these gas streams into the atmosphere results in a substantial air pollution problem because the sulfur dioxide has extremely detrimental effects on animal and plant life. In addition, the discharge of these gas streams into the atmosphere constitutes a waste of a valuable material because the sulfur contained in same is an industrial commodity. Many processes have been proposed for removal of sulfur dioxide from these gas streams. A large percentage of these proposed removal procedures involve contacting the sulfur dioxide-containing gas stream with an aqueous absorbent stream which typically contain materials which chemically or physically react with the sulfur dioxide in order to absorb same into the liquid solution. A common procedure involves the use of a solution of an alkaline reagent, such as the hydroxide and carbonate compounds of ammonia, the alkali metals, and the alkaline earth metals, to produce a rich absorbent stream containing the corresponding sulfite compound.

Although the simple concept of scrubbing $SO_2$ from a gas stream containing same with a scrubbing solution containing an alkaline reagent has many advantages associated with it such as simplicity, versatility, effectiveness, and the like, widespread adoption of this approach to the solution of the $SO_2$ scrubbing problem has been inhibited by the fact that the gas streams which are typically treated for removal of $SO_2$ also contain significant quantities of oxygen. When a gas stream containing both $SO_2$ and $O_2$ is scrubbed by an aqueous solution of an alkaline reagent, the formation of sulfate compounds as one of the by-products of the scrubbing step is inevitably observed. These sulfate by-products are very intractable and present a significant barrier to the use of these conventional scrubbing procedures, particularly where the scrubbing step is coupled with a regeneration step in a closed system wherein the scrubbing solution is continuously being recirculated. These sulfate by-products in a closed system tend to build up in the recycle water stream until finely divided solids are formed. These sulfate solids then can collect in the form of a scale or sludge which can foul the internals of the equipment used in the scrubbing step and in the regeneration step of the closed scrubbing system. Moreover, they can cause severe corrosion and erosion problems in the scrubbing equipment. Also they represent a substantial nonrecoverable loss of alkaline reagent from the system.

The formation of these sulfate by-products is attributed to the interaction of the oxygen contained in the input gas stream with the water-soluble sulfite compound that is formed when the $SO_2$ is absorbed in the scrubbing solution. Hence there is a need for a method for suppressing this oxidation side reaction during the course of the scrubbing step.

The problem addressed by the present invention is, therefore, to provide an improved solution to the problem of suppressing the formation of undesired sulfate by-products during the course of a scrubbing operation which uses a conventional scrubbing solution comprising an alkaline reagent in water.

In my prior application I disclosed a procedure which effectively suppressed the formation of these sulfate by-products without interfering with the mechanics of the $SO_2$-absorption step. The basic concept of this procedure was based on my finding that the water-soluble sulfite compound that is formed by the reaction of the alkaline reagent with $SO_2$ in the scrubbing step can be easily and quickly converted by a suitable reducing agent during the course of the scrubbing step to the corresponding thiosulfate compound. Moreover, this thiosulfate compound has a very small propensity to be oxidized to the corresponding sulfate compound under the conditions maintained in the scrubbing step. Thus, the central feature of my previously disclosed procedure involved introducing sufficient reducing agent into the scrubbing step in order to enable the in situ formation of the corresponding thiosulfate compound, thereby minimizing the opportunity for the oxygen contained in the gas stream to oxidize the water-soluble sulfite compound to the undesired sulfate by-product. Another feature of the disclosed procedure was that the reducing agent was selected from the group consisting of finely divided sulfur, a polysulfide compound, a water-soluble sulfide compound and mixtures thereof. The resulting thiosulfate-containing stream withdrawn from the scrubbing step could then be regenerated by any suitable procedure known to the art for treating a water stream to remove thiosulfate compounds therefrom such as a reduction procedure involving the use of a reducing agent such as hydrogen, a readily oxidized hydrocarbon, carbon monoxide or hydrogen sulfide to reduce the thiosulfate to elemental sulfur or hydrogen sulfide.

In my prior application I also disclosed that the reducing agent which is added to the scrubbing step, could be added in any amount, with the preferred amount being at least stoichiometrically sufficient to reduce all of the absorbed $SO_2$ to the corresponding thiosulfate. Upon further investigation, I have now discerned that there are situations where it is advantageous to use less than the stoichiometric amount of reducing agent in order to suppress at least a portion of the undesired sulfate by-products production. Specifically, I have now established that relatively small amounts of the previously specified reducing agent are effective to suppress a substantial portion of this sulfate production. In fact, I have ascertained that as little as 5% of the amount of the reducing agent which would be stoichiometrically sufficient to reduce all of the absorbed $SO_2$ to thiosulfate will materially suppress this sulfate production. The principal advantage associated with the concept of using a stoichiometric insufficient amount of reducing agent is that it minimizes the danger of contaminating the treated gas stream with minor amounts of the reducing agent utilized in the present invention. For example, in the case where sulfide is utilized as the reducing agent, it is a distinctly preferred mode of operation to avoid contaminating the treated gas stream with even small amounts of hydrogen sulfide because of its well known noxious odor and other detrimental properties. Of course, a possible mode of operation of any sulfate suppression method is to allow some sulfide to contaminate the treated gas stream with a subsequent sulfide-scrubbing step designed to remove the contaminating sulfide. This last mode of operation adds a further complication to the overall process and should be avoided if at all possible. In sum, the concept of the present invention involves minimizing the danger of contaminating the treated gas stream with the reducing agent by operating the scrubbing step under conditions wherein the reducing agent is supplied in an amount which is insufficient to react with all of the absorbed $SO_2$, and yet is effective to suppress a substantial portion of the undesired sulfate production.

It is, accordingly, an object of the present invention to provide a simple, effective and economic method for suppressing the formation of a substantial portion of undesired sulfate by-products without contaminating the treated gas stream in a scrubbing step in which sulfur dioxide is removed from a gas stream containing $SO_2$ and $O_2$ by scrubbing with an aqueous scrubbing solution containing an alkaline reagent.

In brief summary, the present invention is, in one embodiment, an improvement in a process for the removal of $SO_2$ and an input gas stream containing $SO_2$ and $O_2$. In this process the input gas stream is contacted, in a gas-liquid scrubbing zone, with an aqueous scrubbing solution containing an alkaline reagent at scrubbing conditions selected to form a treated gas stream containing substantially less $SO_2$ than the input gas stream and a rich scrubbing solution containing a water-soluble sulfite compound. During the course of this scrubbing step, at least a portion of the oxygen present in the input gas stream reacts with the resulting sulfite compound to form an undesired intractable sulfate by-product. Against this background, the improvement of the present invention involves: adding to the scrubbing zone a reducing agent selected from the group consisting of finely divided sulfur, a polysulfide compound, a water-soluble sulfide compound and mixtures thereof in an amount corresponding to about 5 to about 95% of the stoichiometric amount necessary to convert all of the absorbed $SO_2$ into thiosulfate; and thereafter operating the scrubbing zone under thiosulfate production conditions selected to react the reducing agent with a portion of the water-soluble sulfite compound as it is formed to produce the corresponding thiosulfate compound, thereby suppressing the production of undesired sulfate by-products.

Other objects and embodiments of the present invention are hereinafter disclosed in the following discussion of the input streams, the preferred conditions, the output streams, the preferred reactants and mechanics associated with the essential and preferred steps of the present invention.

The present invention is concerned with a scrubbing step wherein a gas stream containing $SO_2$ and $O_2$ is contacted with a scrubbing solution containing an alkaline reagent. The input gas stream passed to this step is typically a flue or stack gas. For example, a typical stack gas stream contains: about 1 to 10% $O_2$, about 5 to 15% or more $CO_2$, about 3 to 10% or more $H_2O$, about 0.05 to 1% or more $SO_2$ and $N_2$. In some cases, the input gas stream also contains carbon monoxide and oxides of nitrogen. On the other hand, the scrubbing solution is generally characterized as an aqueous solution of a suitable alkaline reagent such as ammonium hydroxide, ammonium carbonate, the alkali metal hydroxides, the alkali metal carbonates, the water-soluble alkaline earth hydroxides and carbonates and the like alkaline reagents. Of the alkali metal reagents, sodium hydroxide, sodium carbonate, potassium hydroxide and potassium carbonate are particularly preferred. The preferred alkaline earth metals are calcium and magnesium. In most cases, excellent results are obtained when the alkaline reagent is ammonium hydroxide or carbonate or sodium hydroxide or carbonate. It is to be noted that the scope of the present invention includes the use of mixtures of the alkaline reagents previously mentioned. In addition, it includes the use of the bicarbonate salt or mixtures of the bicarbonate and normal salts of ammonia, the alkali metal and the alkaline earth metals. In general, acceptable results are obtained with an aqueous scrubbing solution containing about 1 to about 15 wt. % of the alkaline reagent, although solutions containing an amount of the alkaline reagent up to the solubility limit of the particular alkaline reagent at the conditions maintained in the scrubbing step can in many cases be used.

This scrubbing step can be carried out in a conventional scrubbing zone in any suitable manner including multiple stages. The scrubbing solution can be passed into the scrubbing zone in either upward or downward flow and the input gas stream can be simultaneously introduced into the scrubbing zone in concurrent flow relative to the scrubbing solution. A particularly preferred procedure involves downward flow of the scrubbing solution with countercurrent flow of the gas stream which is to be treated. The scrubbing zone is preferably a conventional gas-liquid contacting zone containing suitable means for effecting intimate contact between a descending liquid stream and an ascending gas stream. Suitable contacting means include bubble trays, baffles, and any of the various packing materials known to those skilled in the art. In this countercurrent mode of operation, a treated gas stream is withdrawn from the upper region of the scrubbing zone and a rich scrubbing solution is withdrawn from the lower region thereof. For the class of alkaline reagents of concern here, the rich scrubbing solution would ordinarily contain a water-soluble sulfite compound such as ammonium sulfite and/or bisulfite, sodium sulfite and/or bisulfite and the like. As was previously indicated this rich scrubbing solution will contain undesired sulfate by-products, such as ammonium sulfate, sodium sulfate and the like compound, in rather large amounts, if the improvement of the present invention is not employed.

This scrubbing step is generally conducted under conventional scrubbing conditions which are selected on the basis of the characteristics of the specific alkaline reagent utilized, the sulfur dioxide content of the input gas stream, the portion of the sulfur dixoide that is to be removed in the scrubbing step, and the physical properties of the scrubbing zone. Ordinarily, the scrubbing step is operated at a relatively low temperature of about 10 to 75°C., a relatively low pressure which typically approximates atmospheric, and a circulation rate of scrubbing solution corresponding to a volume ratio of input gas streams to scrubbing solution of about 50:1 to about 10,000:1. When the input gas stream is a flue or stack gas stream, means must ordinarily be provided for cooling the input gas stream to a relatively low temperature before it is introduced into the scrubbing step. Likewise, since the typical operation of the scrubbing step involves the handling of large volumes of gas containing only a relatively small amount of sulfur dioxide, it is preferred that the pressure drop through the scrubbing zone be held to a minimum so as to avoid the necessity of compressing large volumes of gas to overcome the pressure drop within the scrubbing zone.

In accordance with the present invention, the operation of the scrubbing step described above is modified by the introduction into the scrubbing zone of a carefully controlled amount of reducing agent selected from the group consisting of finely divided sulfur, a polysulfide compound, a water-soluble sulfide compound and mixtures thereof. In one mode of operation of the improved scrubbing step, finely divided sulfur is utilized as the reducing agent, and it is preferred that the sulfur be present in particle size of about 10 to about 250 microns, with best results obtained with paticles of about 25 to about 100 microns. Typically, it is a good practice to introduce the sulfur into the scrubbing step via a water stream containing a slurry of finely divided sulfur in an amount of about 1 to about 75 wt. % thereof, although any other suitable means for injecting finely divided solid particles can be utilized if desired. One preferred procedure involves the addition of the required sulfur to the scrubbing solution before it enters the scrubbing zone. In this first mode of operation, it is preferred to also introduce a wetting agent into the scrubbing zone in order to facilitate good contact of the elemental sulfur with the sulfite compound. Suitable wetting agents are: the salts of the alkylaryl sulfonates such as the sodium salt of dodecylbenzene sulfonate; sulfonated fatty acid esters; $C_{12}$ to $C_{16}$ alkyl sulfates: $C_{12}$ to $C_{16}$ alkyl sulfonates; alkyl polyoxyethylene alcohols; ethylene oxide condensations products of alkyl phenols; quaternary ammonium salts such as octadecyldimethylbenzyl ammonium chloride and the like wetting agents. The wetting agent is preferably utilized in a relatively small amount corresponding to about 0.01 to about 1 wt. % of the sulfite compound that is reacted. According to the present invention, the amount of elemental sulfur utilized in this first mode of operation of the improved scrubbing step should be carefully controlled so that it is less than the stoichiometric amount required to reduce all of the absorbed $SO_2$ to thiosulfate; that is, less than one atom of sulfur per molecule of the absorbed $SO_2$, with the preferred amount generally corresponding to about 5 to about 95% of this stoichiometric amount. Excellent results are ordinarily obtained with an amount corresponding to about 30 to about 70% of the stoichiometric amount.

In a second mode of operation of this improved scrubbing step, the reducing agent is a polysulfide compound. Suitable polysulfide compounds include the ammonium, alkali metal, and alkaline earth polysulfides. Best results are ordinarily obtained with ammonium or sodium polysulfide. The polysulfide compound is ordinarily charged to the scrubbing step in the form of an aqueous solution containing about 1 to about 50 wt. % of the polysulfide compound. In fact, a preferred procedure involves the addition of the polysulfide compound to the scrubbing solution before it enters the scrubbing zone. It is to be noted that when the reducing agent is a polysulfide compound, no wetting agent is necessary in order to achieve good contact with the sulfite compound. According to the present invention, the amount of the polysulfide compound charged to the improved scrubbing step in this mode of operation is carefully controlled so that it is less than the stoichiometric amount necessary for the reaction between it and the absorbed $SO_2$ to produce the corresponding thiosulfate compound. In the typical case where the polysulfide compound contains four atoms of elemental sulfur and one atom of sulfide (e.g. $(NH_4)_2 S_5$), the stoichiometric amount is 1/6 moles of polysulfide per mole of absorbed $SO_2$, and the amount utilized should be selected from the range corresponding to about 5 to about 95% of the stoichiometric amount. Excellent results are obtained with an amount corresponding to about 30 to about 70% of the stoichiometric amount.

In a third mode of operation of this improved scrubbing step, the reducing agent is a water-soluble sulfide compound. Suitable water-soluble sulfide compounds are hydrogen sulfide, ammonium sulfide, ammonium hydrosulfide and the sulfides and hydrosulfides salts of the alkali and alkaline earth metals. This water-soluble sulfide compound is preferably introduced into the scrubbing zone by adding it to the scrubbing solution before it enters the zone. Best results are ordinarily obtained in this last mode of operation of this step when the sulfide reactant is hydrogen sulfide or ammonium hydrosulfide or sodium hydrosulfide. According to the present invention, the amount of this sulfide reactant charged to the scrubbing step in this mode of operation is carefully controlled so that it is less than the stoichiometric amount necessary to reduce all of the absorbed $SO_2$ to thiosulfate; that is, less than 0.5 moles of sulfide compound per mole of absorbed $SO_2$, with the amount utilized typically corresponding to about 5 to about 95% of this stoichiometric amount. Excellent results are obtained with an amount of sulfide corresponding to 30 to about 70% of the stoichiometric amount.

Conditions utilized in this improved scrubbing step are generally described as thiosulfate production conditions and typically comprise a temperature of about 5 to about 100°C., a pressure sufficient to maintain the scrubbing solution in the liquid phase, a pH less than 7 and a contact time corresponding to about 0.05 to 1 or more hours. Preferred reaction temperatures are about 20 to 80°C., and a preferred range is about 6.3 to about 6.7. In general, the contact time necessary for the desired reaction is a function of the reducing agent utilized, with relatively short contact times of about 1 to 5 minutes being sufficient in the case where the reducing agent is a polysulfide compound. The other two reducing agents require a relatively longer contact time ranging up to about 0.5 to about 1 hour. Considering all of the factors involved in the operation of this improved scrubbing step, best results are ordinarily obtained when the reducing agent is a polysulfide compound, and particularly ammonium or sodium polysulfide, or a sulfide compound such as ammonium or sodium hydrosulfide.

Following this improved scrubbing step, a rich scrubbing solution is withdrawn therefrom and found to contain a relatively large amounts of the corresponding thiosulfate compound, minor amounts of unreacted sulfite compounds and of the corresponding polythionates and particularly the dithionate, and a substantially reduced amount of undesired, intractable sulfate by-products relative to the amount that would be observed without the benefit of the present invention. Both the thiosulfate compound and the polythionate compounds are easily reduced by suitable reducing agents such as hydrogen, carbon monoxide, an easily oxidizable hydrocarbon or water-soluble sulfide compound to allow the recovery of elemental sulfur or hydrogen sulfide and the regeneration of the scrubbing solution. In sharp contrast, the liquid effluent stream withdrawn from the scrubbing step when it is operated without the benefit of the present invention contains significant amounts of undesired intractable sulfate compound which are extremely difficult to reduce with the above mentioned conventional reducing agents. It is to be noted that the details associated with the regeneration step are not essential to the acquisition of the improved operation of the scrubbing step and consequently are not discussed here.

The following Example is presented to demonstrate the significant contribution associated with the improvement of the present invention. The example is, of course, intended to be illustrative rather than restrictive.

EXAMPLE

A series of experiments were performed on a scale model of an $SO_2$ scrubbing plant for the purpose of demonstrating the degree of sulfate make suppression that can be achieved by the method of the present invention. All of the experiments were performed using sodium carbonate as the alkaline agent in the absorbent and using sodium hydrosulfide as the reducing agent.

The $SO_2$ scrubbing plant comprised a vertically positioned absorption zone having conventional inlet and outlet ports and various flow meters, pumps, valves, recorders and control devices designed to countercurrently contact an ascending gas stream with a descending liquid absorbent stream. The absorption zone comprised a vertically positioned cylindrical vessel having a ½ inch inside diameter and 6 inches of centrally located packing material. The packing material utilized in all runs was particles of 3/16 inch 304 stainless steel helix packing.

The flow scheme utilized in this scrubbing plate essentially comprises passing the input gas stream into the lower region of the absorption zone below the packing material and withdrawal of a treated gas stream from the upper region of the zone. In all cases the conditions utilized in the absorption zone resulted in a treated gas stream which was essentially $SO_2$ free. Simultaneously, the absorbent stream is passed into the absorption zone at two points, the major portion is injected into the middle region of the packing material, and the minor portion of the absorbent is injected into the upper region of the absorption zone above the packing material. The absorbent then flows in a countercurrent fashion down the column into contact with the ascending gas stream and the resulting rich absorbent stream is withdrawn from the zone by means of an outlet port in the bottom of the zone. The resulting rich absorbent stream is split into the two portions; the minor portion, comprising about 20% by volume of the bottom stream from the absorption column, is directly recycled back to the top of the absorption column; and the major portion of the bottoms stream is admixed with fresh absorbent in an amount selected to meet the desired $Na/SO_2$ ratio for proper column operation and returned to the column at a point corresponding to the central region of the packing material. A product stream is withdrawn continuously as a drag stream from the absorbent stream being recirculated to the center portion of the packing material in order to remove the net make of absorbed materials and products from the absorption and reactions occurring in the absorption zone. Thus, the $SO_2$ absorption zone is operated with the continuous recycle of the absorbent around the zone with only a drag stream drawn off for analysis of the products formed in the absorption and thiosulfate formation reactions.

The input gas stream was in all cases a simulated flue gas stream containing 81.6 mole % nitrogen, 5.6 mole % oxygen, 12.5 mole % $CO_2$, 0.2 mole % $SO_2$ and 0.1 mole % NO. This input gas stream was formulated to simulate the type of flue gas stream which would be encountered in the stack of a boiler burning a high sulfur coal.

The alkaline reagent utilized in the absorbent stream in all of the experiments was sodium carbonate. It was added to an aqueous solution in an amount selected to result in the absorbent stream containing about 3.8 wt.

% sodium. Likewise, the reducing agent utilized in all of these experiments was sodium hydrosulfide and it was added to the absorbent in an amount which varied from 0 to 70% of the amount necessary to convert all of the $SO_2$ entering the scrubbing zone to sodium thiosulfate. The stoichiometric amount of sodium hydrosulfide necessary to convert $SO_2$ to sodium thiosulfate is ½ mole of hydrosulfide per mole of $SO_2$. The overall reaction is given by the following equation:

$$SO_2 + \tfrac{1}{2} NaSH + \tfrac{1}{2} Na_2CO_3 \rightarrow \tfrac{3}{4} Na_2S_2O_3 + \tfrac{1}{2} CO_2 + \tfrac{1}{4} H_2O$$

The conditions utilized in all of the experiments were: an absorption zone temperature of 55°C., an absorption zone pressure of 14.8 psia, a circulation rate of entering gas to absorbent on a volume basis of 300:1, an input gas flow rate of 2.65 standard cubic feet of gas per hour, an $SO_2$ injection rate of 0.0067 moles of $SO_2$ per hour, a fresh absorbent addition rate sufficient to achieve a mole ratio of sodium entering the scrubbing plant to $SO_2$ entering the scrubbing plant of 1.65:1 and an absorbent feed rate of 12 cc per hour. These conditions were sufficient in all cases to result in absorption of substantially all of the entering $SO_2$.

A series of experiments were then made with this plant where the only variable was the amount of sulfide reducing agent added to the fresh absorbent stream. Experiments were conducted with this variable set at 0, 30, 50 and 70% of the stoichiometric amount of sulfide necessary to convert all of the $SO_2$ entering the plant in the input gas stream to the corresponding thiosulfate according to reduction reaction given above. The results of these experiments are presented in the attached graph which shows the amount of the entering $SO_2$ which is converted to undesired, intractable sodium sulfate as a function of the amount of reduction agent added to the absorbent stream relative to the stoichiometric amount necessary to convert all entering $SO_2$ to $Na_2S_2O_3$ according to previously given equations.

With reference now to the attached graph, it can be seen that the effect of the reducing agent is material and significant even at relatively small amounts. Specifically, the control run shows that when the present invention is not utilized (i.e., no reducing agent is added to the absorbent) that about 22 to about 26% of the $SO_2$ charged to the plant is converted during the absorption step into sodium sulfate. In contrast the use of the present invention sharply reduces this sulfate make even with relatively minor amounts of reducing agent. For instance, the use of sulfide in an amount corresponding to 30% of the stoichiometric amount reduced sulfate formation by about 35% as measured against the results achieved in the control run. Likewise, the use of 50% stoichiometric sulfide reduced the sulfate formation by approximately 55%. And, finally, the use of about 70% of the stoichiometric amount reduced sulfate formation by about 73%. Allowing for the normal scatter of the experimental data, it can be seen from the attached graph that it is entirely reasonable to conclude that the reduction of sulfate formation is approximately linear with added reducing agent. Thus it appears about 5 to about 95% of the stoichiometric amount of reducing agent can be utilized to significantly reduce sulfate formation in this type of scrubbing operation.

It is intended to cover by the following claims all changes, modifications and variations of the invention disclosed herein that it would be self-evident to a man of ordinary skill in the gas purification or scrubbing art.

I claim as my invention:

1. In a process for the removal of $SO_2$ from an input gas stream containing $SO_2$ and $O_2$, wherein the input gas stream is contacted, in a gas-liquid scrubbing zone, with an aqueous scrubbing solution containing an alkaline reagent at scrubbing conditions selected to form a treated gas stream containing substantially less $SO_2$ than the input gas stream and a rich scrubbing solution containing a water-soluble sulfite compound and wherein at least a portion of the oxygen present in the input gas stream reacts with a portion of the resulting sulfite compound to form an undesired, intractable sulfate by-product, the improvement comprising; adding to the scrubbing zone a reducing agent, selected from the group consisting of finely divided sulfur, a polysulfide compound, water-soluble sulfide compound and mixtures thereof, said finely divided sulfur being added in an amount of from about .05 to about 0.95 atoms of sulfur per molecule of absorbed $SO_2$, said polysulfide compound being added in an amount of about .05 to about .95 moles of polysulfide per 6 moles of absorbed $SO_2$, and said water-soluble sulfide being added in an amount of from about .025 to about 0.495 moles of sulfide per mole of absorbed $SO_2$ and thereafter, operating the scrubbing zone under thiosulfate production conditions selected to react the reducing agent with a portion of the water-soluble sulfite compound as it is formed to produce the corresponding thiosulfate compound, thereby suppressing the production of undesired sulfate by-products.

2. An improved process as defined in claim 1 wherein the alkaline reagent contained in the scrubbing solution is ammonium carbonate or bicarbonate.

3. An improved process as defined as in claim 1 wherein the alkaline reagent contained in the scrubbing solution is ammonium hydroxide.

4. An improved process as defined as in claim 1 wherein the alkaline reagent contained in the scrubbing solution is an alkali metal hydroxide or carbonate or bicarbonate.

5. An improved process as defined in claim 4 wherein the alkali metal is sodium.

6. An improved process as defined as in claim 4 wherein the alkali metal is potassium.

7. An improved process as defined as in claim 1 wherein the alkaline reagent contained in the scrubbing solution is an alkaline earth metal hydroxide, carbonate or bicarbonate.

8. An improved process as defined as in claim 7 wherein the alkaline earth metal is calcium.

9. An improved process as defined in claim 7 wherein the alkaline earth metal is magnesium.

10. An improved process as defined in claim 1 wherein the thiosulfate production conditions include a temperature of about 5 to about 100°C., a pressure sufficient to maintain the scrubbing solution in the liquid phase and a pH less than 7.

11. An improved process as defined as in claim 1 wherein the reducing agent is finely divided sulfur.

12. An improved process as defined as in claim 11 wherein a wetting agent is also added to the contacting zone.

13. An improved process as defined as in claim 12 wherein the wetting agent is a quaternary ammonium salt.

14. An improved process as defined as in claim 1 wherein the reducing agent is a polysulfide compound.

15. An improved process as defined in claim 14 wherein the polysulfide compound is sodium or ammonium polysulfide.

16. An improved process as defined as in claim 1 wherein the reducing agent is a water-soluble sulfide compound.

17. An improved process as defined as in claim 16 wherein the water-soluble sulfide compound is hydrogen sulfide.

18. An improved process as defined as in claim 16 wherein the water-soluble sulfide compound is ammonium hydrosulfide.

19. An improved process as defined as in claim 16 wherein the water-soluble sulfide compound is sodium sulfide.

20. An improved process as defined as in claim 1 wherein said finely divided sulfur is added in an amount of from about .3 to about 0.7 atoms of sulfur per molecule of absorbed $SO_2$, said polysulfide compound is added in an amount of about .3 to about .7 moles of polysulfide per 6 moles of absorbed $SO_2$, and said water-soluble sulfide is added in an amount of from about .15 to about 0.35 moles of sulfide per mole of absorbed $SO_2$.

* * * * *